US009658069B2

(12) United States Patent
Stählin et al.

(10) Patent No.: US 9,658,069 B2
(45) Date of Patent: May 23, 2017

(54) METHOD FOR DETERMINING A REFERENCE POSITION AS THE STARTING POSITION FOR AN INERTIAL NAVIGATION SYSTEM (71) Applicant: Continental Teves AG & Co. oHG, Frankfurt (DE)

(72) Inventors: Ulrich Stählin, Eschborn (DE); Klaus Rink, Rodenbach (DE); Marc Menzel, Welmar (DE); Michael Zalewski, Bruchköbel (DE)

(73) Assignee: Continental Teves AG & Co. oHG, Frankfurt (DE)

( * ) Notice: Subject to any disclaimer, the term of this patent is extended or adjusted under 35 U.S.C. 154(b) by 29 days.

(21) Appl. No.: 14/650,415

(22) PCT Filed: Dec. 11, 2013

(86) PCT No.: PCT/EP2013/076193
§ 371 (c)(1),
(2) Date: Jun. 8, 2015

(87) PCT Pub. No.: WO2014/095510
PCT Pub. Date: Jun. 26, 2014

(65) Prior Publication Data
US 2015/0369608 A1 Dec. 24, 2015

(30) Foreign Application Priority Data

Dec. 20, 2012 (DE) .................. 10 2012 224 107

(51) Int. Cl.
*G01C 21/36* (2006.01)
*G01C 21/16* (2006.01)
*G01S 19/13* (2010.01)

(52) U.S. Cl.
CPC ........... *G01C 21/16* (2013.01); *G01C 21/165* (2013.01); *G01S 19/13* (2013.01)

(58) Field of Classification Search
USPC ..... 701/23, 28, 409, 437, 438; 700/258, 259
See application file for complete search history.

(56) References Cited

U.S. PATENT DOCUMENTS 5,751,576 A * 5/1998 Monson ............. A01M 7/0089
239/161
6,006,161 A * 12/1999 Katou .................. G08G 1/0969
340/988

(Continued)

FOREIGN PATENT DOCUMENTS

DE 102006029148 1/2008
DE 102008020446 3/2009

(Continued)

OTHER PUBLICATIONS

German Search Report for German Application No. 10 2012 224 107.8 mailed Jun. 4, 2013, including partial translation.

(Continued)

*Primary Examiner* — Thomas Tarcza
*Assistant Examiner* — Richard Goldman
(74) *Attorney, Agent, or Firm* — RatnerPrestia (57) ABSTRACT A method for determining a reference position as the basis for a starting position for an inertial navigation system which is designed to determine the location of a vehicle on the basis of the starting position and a change in the relative position of the vehicle, the method including the steps of: detecting an ambient condition around the vehicle, determining a position of the vehicle at the location of the detected ambient condition, and assigning the determined position to the detected ambient condition as a reference position.

10 Claims, 4 Drawing Sheets

(56) References Cited

U.S. PATENT DOCUMENTS

| | | | |
|---|---|---|---|
| 6,608,913 | B1 | 8/2003 | Hinton |
| 8,442,791 | B2 | 5/2013 | Stahlin |
| 8,517,628 | B2* | 8/2013 | Weiser ............... E01C 19/48 |
| | | | 404/84.05 |
| 8,725,412 | B2 | 5/2014 | Kobori |
| 8,855,867 | B2 | 10/2014 | Gunther |
| 2005/0126833 | A1 | 6/2005 | Takenaka |
| 2005/0222762 | A1* | 10/2005 | Hamilton ........... G01C 21/3492 |
| | | | 701/414 |
| 2006/0149472 | A1* | 7/2006 | Han .................... G01C 21/28 |
| | | | 701/14 |
| 2006/0287817 | A1* | 12/2006 | Nagel ................... B60W 30/09 |
| | | | 701/507 |
| 2007/0061066 | A1* | 3/2007 | Bruelle-Drews ...... G01C 21/26 |
| | | | 701/532 |
| 2008/0065287 | A1* | 3/2008 | Han .................... A01B 69/007 |
| | | | 701/28 |
| 2008/0234930 | A1* | 9/2008 | Cheok ................. G01S 5/0289 |
| | | | 701/408 |
| 2009/0125321 | A1 | 5/2009 | Charlebois et al. |
| 2010/0004856 | A1* | 1/2010 | Kobori ................. G01S 19/48 |
| | | | 701/532 |
| 2010/0169013 | A1* | 7/2010 | Nakamura ............ G01C 21/30 |
| | | | 701/469 |
| 2010/0274430 | A1* | 10/2010 | Dolgov ................. G01C 21/20 |
| | | | 701/25 |
| 2011/0178708 | A1 | 7/2011 | Zhang |
| 2012/0197519 | A1 | 8/2012 | Richardson |
| 2012/0245842 | A1* | 9/2012 | Spindler ............ G01C 21/3638 |
| | | | 701/438 |
| 2012/0303255 | A1* | 11/2012 | Wong .................. G05D 1/0274 |
| | | | 701/300 |
| 2013/0046461 | A1* | 2/2013 | Balloga .................... G01C 3/04 |
| | | | 701/438 |
| 2013/0103306 | A1* | 4/2013 | Uetake .............. G01C 21/3605 |
| | | | 701/425 |
| 2013/0158857 | A1* | 6/2013 | Dutta .................... G01C 21/26 |
| | | | 701/409 |
| 2013/0190963 | A1* | 7/2013 | Kuss .................... B66F 9/063 |
| | | | 701/23 |
| 2013/0238130 | A1* | 9/2013 | Dorschel ............. A01D 34/008 |
| | | | 700/259 |
| 2013/0304383 | A1* | 11/2013 | Bageshwar ......... G01C 21/165 |
| | | | 701/534 |
| 2013/0325320 | A1* | 12/2013 | Dimitriadis ........ G01C 21/3415 |
| | | | 701/414 |
| 2015/0106008 | A1* | 4/2015 | Hernandez ............ G01C 21/16 |
| | | | 701/408 |
| 2015/0160019 | A1* | 6/2015 | Biswal .................. G01C 21/26 |
| | | | 701/1 |
| 2015/0178998 | A1* | 6/2015 | Attard .................. G07C 5/0808 |
| | | | 701/23 |
| 2015/0211858 | A1* | 7/2015 | Jerauld ................ G02B 27/017 |
| | | | 701/541 |
| 2015/0239575 | A1* | 8/2015 | Sundararajan ......... B64D 45/00 |
| | | | 701/14 |
| 2015/0293216 | A1* | 10/2015 | O'Dea .................. B60W 30/12 |
| | | | 701/23 |
| 2015/0323338 | A1* | 11/2015 | Rainisto ............ G01C 21/3492 |
| | | | 701/408 |
| 2015/0369608 | A1* | 12/2015 | Stahlin ................ G01C 21/165 |
| | | | 701/409 |
| 2015/0379715 | A1* | 12/2015 | Chandrasekar .... G06K 9/00664 |
| | | | 701/28 |
| 2016/0039358 | A1* | 2/2016 | Okuda ............... B60W 30/143 |
| | | | 348/148 |
| 2016/0147223 | A1* | 5/2016 | Edwards .............. G05D 1/0027 |
| | | | 701/2 |

FOREIGN PATENT DOCUMENTS

| | | |
|---|---|---|
| DE | 102011119762 | 6/2012 |
| DE | 102011007024 | 10/2012 |
| EP | 2019287 | 1/2009 |
| EP | 2270431 | 1/2011 |
| GB | 2289389 | 11/1995 |
| JP | 2000171249 | 6/2000 |
| JP | 2008002906 | 1/2008 |
| JP | 2010152139 | 7/2010 |
| JP | 2011504625 A | 2/2011 |
| WO | 2011098333 | 8/2011 |

OTHER PUBLICATIONS

International Search Report for International Application No. PCT/EP2013/076193 mailed Sep. 19, 2014.

Japanese Office Action dated May 25, 2016 for Japanese Application No. 2015-546994, including English translation, 6 pages.

Japanese Office Action with translation for Japanese Application No. 2015-546994, dated Feb. 15, 2017, 6 pages.

* cited by examiner

METHOD FOR DETERMINING A REFERENCE POSITION AS THE STARTING POSITION FOR AN INERTIAL NAVIGATION SYSTEM

CROSS REFERENCE TO RELATED APPLICATIONS

This application is the U.S. National Phase Application of PCT/EP2013/076193, filed Dec. 11, 2013, which claims priority to German Patent Application No. 10 2012 224 107.8, filed Dec. 20, 2012, the contents of such applications being incorporated by reference herein.

FIELD OF THE INVENTION

The invention relates to a method for determining a reference position as a starting position for an inertial navigation system, a method for operating an inertial navigation system on the basis of the determined reference position, a method for plotting a map in a navigation system on the basis of the determined reference position, a control device for implementing the method and a vehicle comprising the control device.

BACKGROUND OF THE INVENTION

WO 2011/098 333 A1, which is incorporated by reference, discloses using in a vehicle various sensor values in order to improve existing sensor values or to generate new sensor values and hence to increase the information that can be acquired.

SUMMARY OF THE INVENTION

An aspect of the invention is to improve the use of a plurality of sensor values for increasing information.

According to an aspect of the invention, a method for determining a reference position as the basis for a starting position for an inertial navigation system, which is designed to determine the position of the vehicle from the starting position and a relative position change of the vehicle, comprises the steps:
  detecting an ambient condition around the vehicle,
  determining a position of the vehicle at the location of the detected ambient condition, and
  associating with the detected ambient condition the determined position as a reference position.

The defined method is based on the consideration that an inertial navigation system is a sensor system for determining a position change of a spatially moving object such as a vehicle. Therefore in order to determine an absolute position of the object, a starting position of the object is needed as the reference position, with regard to which the position change of the object is considered in order to determine the absolute position of the object.

In order to determine this starting position, the defined method proposes using a reference position at a known absolute position which the vehicle can determine for itself from a known ambient condition at this known absolute position. It makes no difference for the implementation of the method which absolute positions as reference positions are associated to ambient conditions present at these absolute positions. It is only important here that the vehicle can detect the ambient condition, and this ambient condition is associated with a unique reference position that the inertial navigation system can use as a reference position for continued locating of the vehicle. The reference position determined in this way could be used, for example, directly as the starting position. Alternatively, however, the reference position could also be used to calculate the starting position, for instance if the reference position is meant to be used as a basis for correcting an already known starting position.

The vehicle would thereby be independent of navigation systems that determine an absolute location, such as satellite navigation systems for instance, and could continue to be operated, for example, in the event of outage of the satellite resulting from a malfunction or in the event of an outage of the satellite signal in a tunnel.

Particularly advantageously, the starting position could be determined by direct or indirect correction of the reference position on the basis of a position of the vehicle that is determined by a satellite navigation system. Direct correction is here intended to mean that the reference position is recalculated directly without further intermediate steps using the position from the satellite navigation system. Indirect correction is here intended to mean that the reference position is recalculated first using another position, for example, and the result is then recalculated using the position from the satellite navigation system.

Such locating or position-finding systems in which a satellite navigation system and an inertial navigation system are combined to determine the vehicle position are known as loosely coupled global navigation satellite system (GNSS) systems, tightly coupled GNSS systems or deeply coupled GNSS systems. They all have the problem, however, that vehicle-dynamics sensors in the context of inertial navigation can only be used to improve the relative position-finding. In order to correct an incorrect starting position, however, an additional, improved and hence more expensive satellite navigation receiver would be needed. The satellite navigation receivers in an aforesaid position-finding system are hence the decisive factor in determining the absolute accuracy.

If there is interference, however, such as atmospheric interference for example, which standard satellite navigation receivers cannot compensate for, the inertial navigation system consequently also determines the vehicle location on the basis of a correspondingly incorrect starting position.

This is where the fundamental idea behind the method comes in, by using ambient conditions on the road to search for reference positions, the absolute spatial position of which is known and which hence can be used as redundant information for correcting a potentially incorrect starting position from a satellite navigation system in an aforementioned position-finding system.

In a particular development of the defined method, the determined position is associated as a reference position with the detected ambient condition on the basis of a probability with which the vehicle passes the reference position.

This development is based on the consideration that the vehicle itself can create for itself the reference position by storing, at locations which it repeatedly passes, the ambient conditions around such a location, by locating i.e. determining the position at this point, and then associating with the stored ambient condition the located i.e. determined position as a reference position. On returning to this location, the vehicle can hence detect this location by comparing with the stored ambient conditions, and then use the reference position associated with the stored ambient condition for continued operation of the position-finding system.

The probability should here depend on a frequency of detection of the ambient condition which is associated with the determined position as a reference position, because it should be ascertained that the vehicle returns more frequently to the location. In order to avoid an unnecessarily large amount of memory space being occupied by locations to which the vehicle will never return again, the frequency should be set to such a value that only regularly traveled routes such as commuting routes between work and home are included in determining the reference position in the defined method.

In a particular development of the defined method, the reference position is a filter value from a number of determined positions at the point of the detected ambient condition around the vehicle. That is to say, on every occasion, or at certain intervals, when the vehicle passes the location at which the ambient conditions associated with the reference position are detected, the position-finding system can also detect the position itself. The positions thus detected in total can then be filtered using any rule, such as averaging for example, in order to eliminate over time the aforesaid atmospheric interference, for instance, which results in errors in the reference position.

In another development, the defined method comprises the step of initiating the detection of the ambient condition on the basis of a characteristic event. This characteristic event constitutes a trigger, with the aim of avoiding continuous detection of the ambient conditions and hence using an exorbitantly large amount of memory to store the detected ambient conditions. The characteristic event can be designed to be event-oriented, for example on the basis of certain objects on the road such as traffic lights etc., or time-oriented.

In a preferred development, the characteristic event is a predetermined point in time or time period. The time-oriented detection of the ambient conditions is particularly advantageous because it is thereby possible to check at regular intervals which location areas are driven to more frequently and which are not.

According to a further aspect of the invention, a method for operating an inertial navigation system, which is designed to determine an absolute position of a vehicle, comprises the steps:
  determining a reference position using a defined method,
  determining a starting position for the inertial navigation system on the basis of the reference position, and
  determining the absolute position of the vehicle on the basis of the starting position.

Determining the starting position on the basis of the reference position can be performed in here in the manner described above.

According to a further aspect of the invention, a method for plotting a map in a navigation system comprises the steps:
  determining a reference position using a defined method, and
  entering into the map the determined reference position as an item of metadata and/or road segment.

The defined method is based on the consideration that identified reference points at which the vehicle is located more frequently could also be used for checking the plausibility of map data. If the map data is outdated, it could be updated on the basis of the determined reference positions.

A starting position in the sense of the method shall be understood to mean all the positions from which a forward projection can be performed by means of incremental techniques, where incremental techniques shall be understood to include, for example, also filtering techniques based on vehicle-dynamics data.

According to a further aspect of the invention, a control device is designed to implement one of the defined methods.

In a development of the defined control device, the defined device comprises a memory and a processor. In this development, one of the defined methods is stored in the form of a computer program in the memory, and the processor is intended to execute the method when the computer program is loaded from the memory into the processor.

According to a further aspect of the invention, a computer program comprises program code means in order to implement all the steps of one of the defined methods when the computer program is executed on a computer or on one of the defined devices.

According to a further aspect of the invention, a computer program product contains a program code which is stored on a machine-readable data storage medium and which implements one of the defined methods when it is executed on a data processing device.

According to a further aspect of the invention, a vehicle comprises a defined control device.

BRIEF DESCRIPTION OF THE DRAWINGS

The above-described properties, features and advantages of this invention, and the way in which they are achieved, are elucidated and explained more clearly by the following description of the exemplary embodiments, which are explained in greater detail in conjunction with the drawings, in which.

DETAILED DESCRIPTION OF THE INVENTION

In the figures, the same technical elements are denoted by the same reference signs and are described only once.

Figure 1:
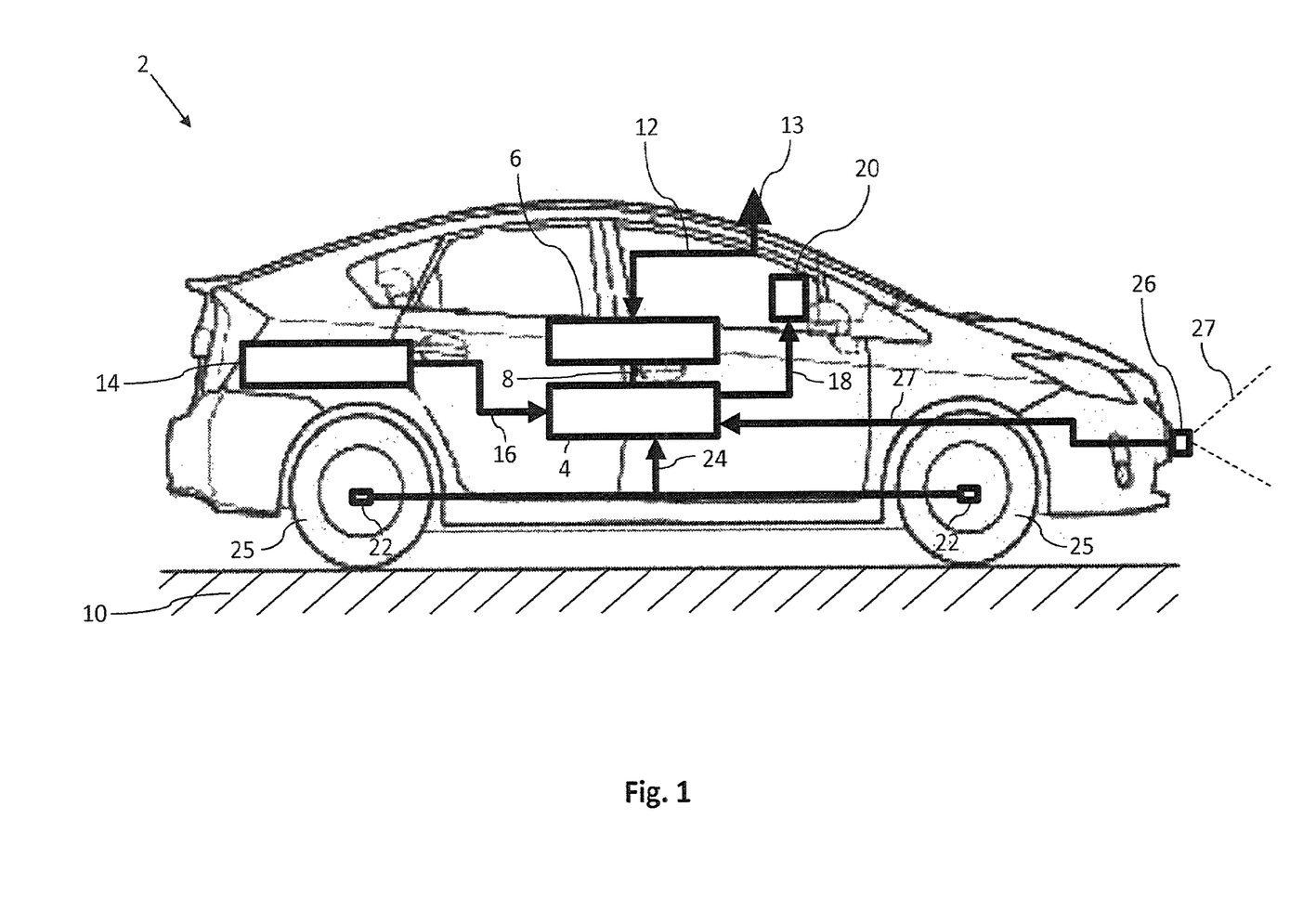
FIG. 1 is a block diagram of a vehicle on a road.

Reference is made to FIG. 1, which shows a block diagram of a vehicle 2 having a fusion sensor 4.

In the present embodiment, the fusion sensor 4 receives position data 8 of the vehicle 2 via a GNSS receiver 6 known per se, which data comprises an absolute position of the vehicle 2 on a roadway 10. In addition to the absolute position, the position data 8 from the GNSS receiver 6 also comprises a velocity of the vehicle 2. In the present embodiment, the position data 8 from the GNSS receiver 6 is derived in the GNSS receiver 6 from a GNSS signal 12 in a manner known to a person skilled in the art, which signal is received via a GNSS antenna 13 and is hence referred to below as GNSS position data 8. Details of this can be found in the relevant technical literature.

The fusion sensor 4 is designed, in a manner to be described below, to increase the information content of the GNSS position data 8 derived from the GNSS signal 12. This is needed partly because the GNSS signal 12 has a very low signal-to-noise ratio and hence can be very inaccurate, and partly because the GNSS signal 12 is not constantly available.

In the present embodiment, the vehicle 2 comprises for this purpose an inertial sensor 14, which acquires the vehicle-dynamics data 16 of the vehicle 2. As is known, this data includes a longitudinal acceleration, a lateral acceleration and a vertical acceleration, and a roll rate, a pitch rate and a yaw rate of the vehicle 2. This vehicle-dynamics data 16 is used in the present embodiment to increase the information content of the GNSS position data 8, and, for instance, to specify more accurately the position and velocity of the vehicle 2 on the roadway 10. The more accurately specified position data 18 can then be used by a navigation device 20 even when the GNSS signal 12 is completely unavailable, for example in a tunnel.

In order to increase the information content of the GNSS position data 8 further, wheel-speed sensors 22 can optionally also be used in the present embodiment, which detect the wheel speeds 24 of the individual wheels 25 of the vehicle 2.

In the present embodiment, the vehicle 2 further comprises a surround sensor 26 in the form of a front camera 26, which records an image 27 in front of the vehicle 2 viewed in a direction of travel (not denoted by a reference sign) of the vehicle 2, and outputs said image to the fusion sensor 4. Further details of this are given later.

Figure 2:
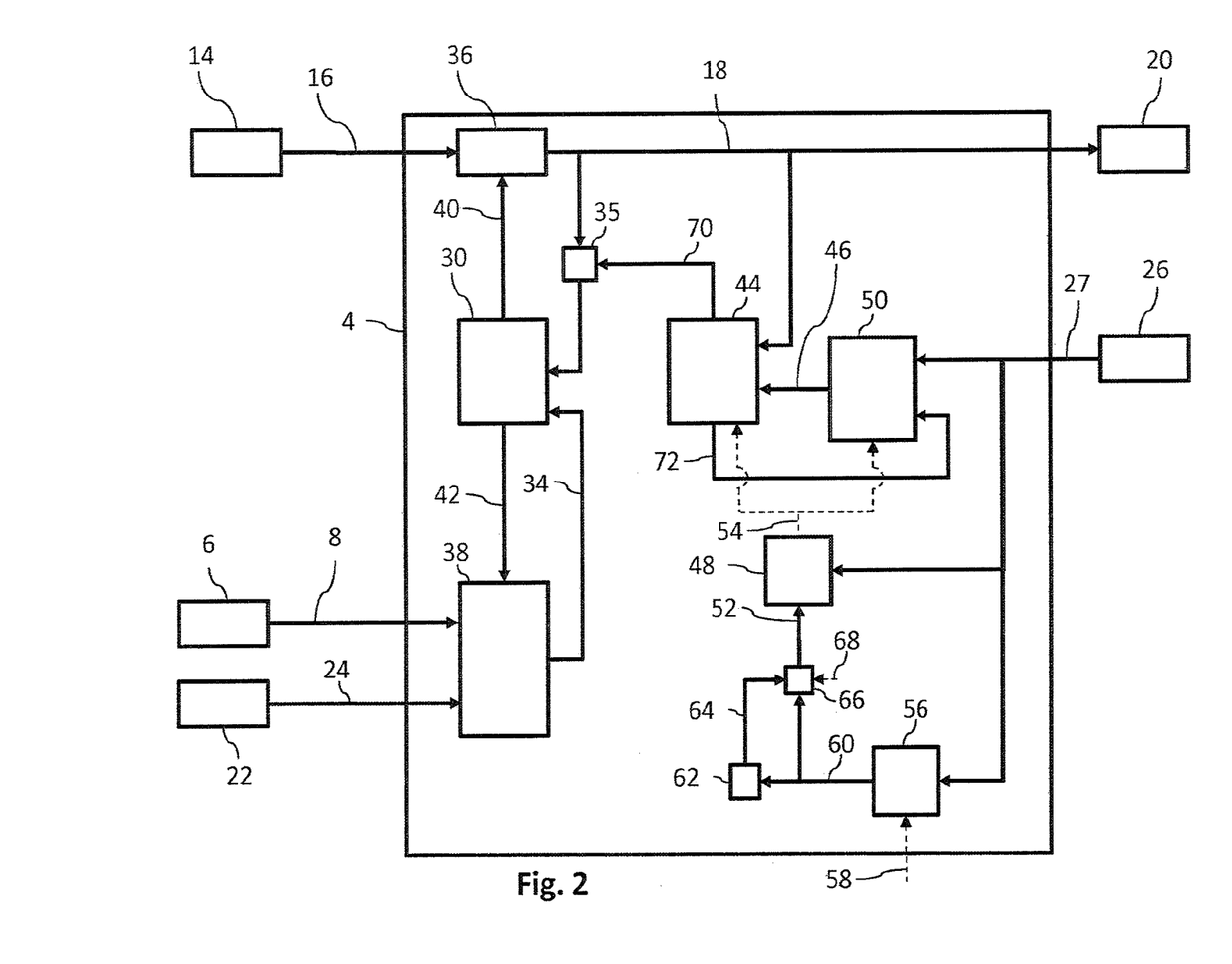
FIG. 2 is a block diagram of a fusion sensor in the vehicle from FIG. 1.

Reference is made to FIG. 2, which shows a block diagram of the fusion sensor 4 from FIG. 1.

The measurement data already mentioned in FIG. 1 is input to the fusion sensor 4. The fusion sensor 4 is intended to output the more accurately specified position data 18. The fundamental idea here is to compare in a filter 30 the information from the GNSS position data 8 with the vehicle-dynamics data 16 from the inertial sensor 14 and thereby increase a signal-to-noise ratio in the position data 8 from the GNSS receiver 6 or in the vehicle-dynamics data 16 from the inertial sensor 14. Although the filter can have any design for this purpose, a Kalman filter is the most effective solution to this problem, requiring relatively low processing resources. Therefore the filter 30 shall preferably be a Kalman filter 30 below.

The more accurately specified position data 18 from the vehicle 2 and comparative position data 34 from the vehicle 2 are input to the Kalman filter 30 via a correction element 35 to be described later. In the present embodiment, the more accurately specified position data 18 is generated from the vehicle-dynamics data 16 in a strapdown algorithm 36 known, for example, from DE 10 2006 029 148 A1, which is incorporated by reference. This data contains more accurately specified position information about the vehicle but also other position data about the vehicle 2 such as, for example, its velocity, its acceleration and its heading. In contrast, the comparative position data 34 is obtained from a model 38 of the vehicle 2, which model is initially supplied with the GNSS position data 8 from the GNSS receiver 6. Then the comparative position data 34, which contains the same information as the more accurately specified position data 18, is determined in the model 38 from this GNSS position data 8. The more accurately specified position data 18 and the comparative position data 34 differ merely in terms of their values.

The Kalman filter 30 calculates on the basis of the more accurately specified position data 18 and the comparative position data 34 an error budget 40 for the more accurately specified position data 18, and an error budget 42 for the comparative position data 34. An error budget shall be understood below to mean a total error in a signal, which error is composed of various individual errors in the acquisition and transmission of the signal. For the GNSS signal 12 and hence for the GNSS position data 8, a corresponding error budget may be composed of errors from the satellite orbit, from the satellite clock and from residual refraction effects and of errors in the GNSS receiver 6.

The error budget 40 for the more accurately specified position data 18, and the error budget 42 for the comparative position data 34 are then input respectively to the strapdown algorithm 36 and the model 38 for correcting the more accurately specified position data 18 and the comparative position data 34 respectively. In other words, the more accurately specified position data 18 and the comparative position data 34 are cleaned iteratively of their errors.

In the manner described above, the fusion filter 4 can use the GNSS position data 8 and the wheel speeds 24 as a basis for excellent correction of the vehicle-dynamics data 16 of the vehicle 2 acquired by the inertial sensor 14.

The situation is different, however, for an absolute position of the vehicle 2, for which position only the GNSS receiver 6 would actually be available, which outputs the absolute position of the vehicle 2 using the GNSS position data 8. Since there are no comparative values available in the vehicle 2 for the absolute position of the vehicle 2, errors in the acquisition of the absolute position, for instance such as atmospheric interference, cannot be corrected and therefore reduce the data integrity of the more accurately specified position data 18.

In order to increase the data integrity of the more accurately specified position data 18, the present embodiment proposes creating these comparative values for the absolute position of the vehicle. In the present embodiment, a further filter 44 is provided for this purpose, which can be chosen to be similar to the filter 30 and is meant to be a Kalman filter 44, for example. In the present embodiment, both filters 30, 44 are implemented as separate elements only for the sake of clarity and, for example, can also be a common filter, although further details of this are not given here for the sake of brevity.

The intention in the present embodiment is to determine iteratively by means of the further Kalman filter 44 a reference position 46 used to correct the absolute position. An image recognition device 48 is arranged for this purpose in the present embodiment, which device receives from the camera 26 shown in FIG. 1 the image 27 and activates by means of an activation signal 54 the further Kalman filter 44 and a memory 50 (to be described below) on the basis of a predetermined object 52 recognized in the image 27.

In the present embodiment, the predetermined object 52 is generated by a search device 56, which uses a time signal 58 as a basis for searching in the image 27 at regular intervals for suitable objects 60 for ascertaining the reference position 46. The suitable object 60 found by the search device 56 is stored in a count memory 62, which assigns to the suitable object 60 a count 64 that indicates how often the search device 56 has already found the suitable object 56. If a driver of the vehicle 2 drives along an identical route to work every day, for instance, and within a timeframe of 5 to 8 minutes predetermined by the time signal 58 comes to a set of traffic lights, for example, as a suitable object 60 for ascertaining the reference position 46, then this set of traffic lights is stored in the count memory 62. The object 60 stored in the count memory 62 is here enabled as the predetermined object 52 for the image recognition if an enabling device 66 identifies that the count 64 exceeds a predetermined threshold value 68, for example 3, 5 10, and therefore the suitable object 60 is identified as an object that lies on a regularly travelled route.

If the predetermined object 52 is enabled for image recognition, and if the image recognition device 48, which moreover could also be combined with the search device 56, recognizes the predetermined object 52 in the image 27, then the further Kalman filter 44 and the aforesaid memory 50 are activated by means of the activation signal 54. The further Kalman filter 44 reads the reference position 46 from the memory 50 and compares this position with the more accurately specified position 18 in a manner known to a person skilled in the art. A position error 70 in the more accurately specified position 18, and a reference error 72 in the reference position 46 can thereby be found in the further Kalman filter 44.

The position error 70 can then be used to correct, by means of the previously mentioned correction unit 35, the more accurately specified position 18 before input to the first Kalman filter 30. Likewise, the reference error 72 can be used to correct the reference position 46 in the memory 50 in a manner that is not shown in greater detail but is known per se. The reference position 46 stored in the memory is thereby corrected whenever the vehicle 2 passes the predetermined object 52, with the result that the reference position 46 converges over time with the exact position of the predetermined object 52.

By virtue of the position error 70 corrected in the more accurately specified position 18, the error budget 40 and hence the starting value for strapdown algorithm 36 is also corrected, with the result that the strapdown algorithm 36 outputs a more accurately specified position 18 that is more accurate.

In the present embodiment, the memory 50 was considered to be a memory that stored only a single reference position 46. The memory 50, however, can also store a plurality of reference positions 46 at which various predetermined object 52 are located. For this purpose, the predetermined objects 52 and their reference positions 46 must be linked to one another in the memory 50 in a manner known per se. No further details are given in the present exemplary embodiment for the sake of clarity.

Figure 3:
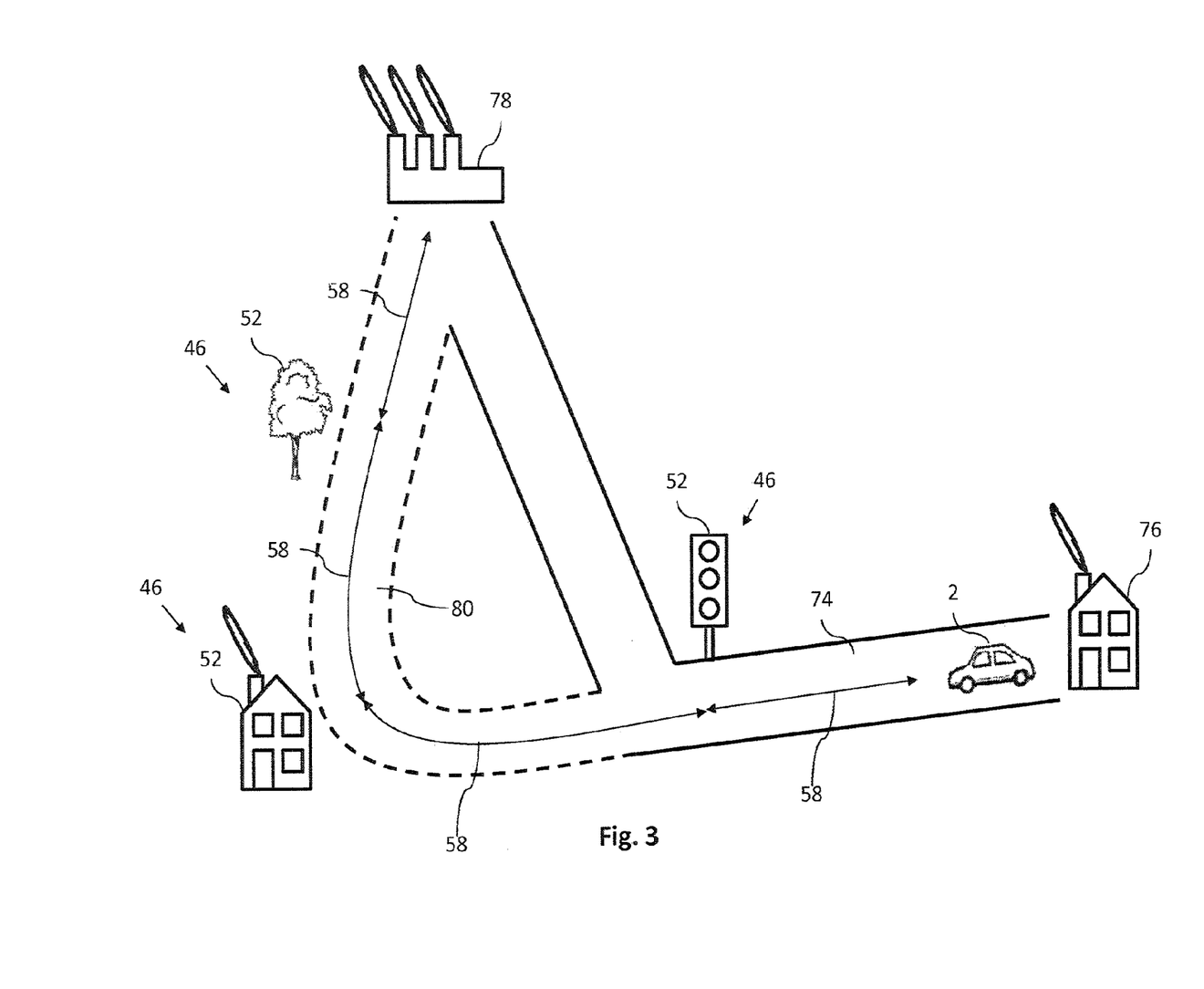
FIG. 3 is a block diagram of the vehicle from FIG. 1 on a road.

Reference is made to FIG. 3, which shows a block diagram of the vehicle 2 from FIG. 1 on a road 74.

The vehicle 2 is intended to commute daily on the road 74 between a home 76 of the driver of the vehicle 2 and the driver's workplace 78.

It shall be assumed here that the road 74 in one area has been relocated to a new road segment 80, shown dashed. A map in the navigation system 20 of the vehicle 2 might not include this new road segment 80.

Particularly advantageously, however, this new road segment 80 can be added by the defined method, which is executed, for example, in the fusion sensor 4 in the manner already described by way of example.

With reference to FIG. 3, the time signal 58 defines on the basis of an assumed average speed of the vehicle 2, route segments on the journey between home 76 and work 78, where the individual route segments are denoted by the reference sign of the time signal 58 to improve understanding. If the vehicle 2 approaches with a sufficiently high frequency, set by the threshold value 68, a suitable object 60, which in FIG. 3 is a set of traffic lights, a house and a tree by way of example, and the suitable object 60 is thus selected as the predetermined object 52, and a reference position 46 is assigned to said object in the manner described above, then it can be assumed that the course of the road 74 includes these reference positions 46. Hence these reference positions 46 can also be used in order to add the new road course 80 to the map in the navigation device 20.

Figure 4:
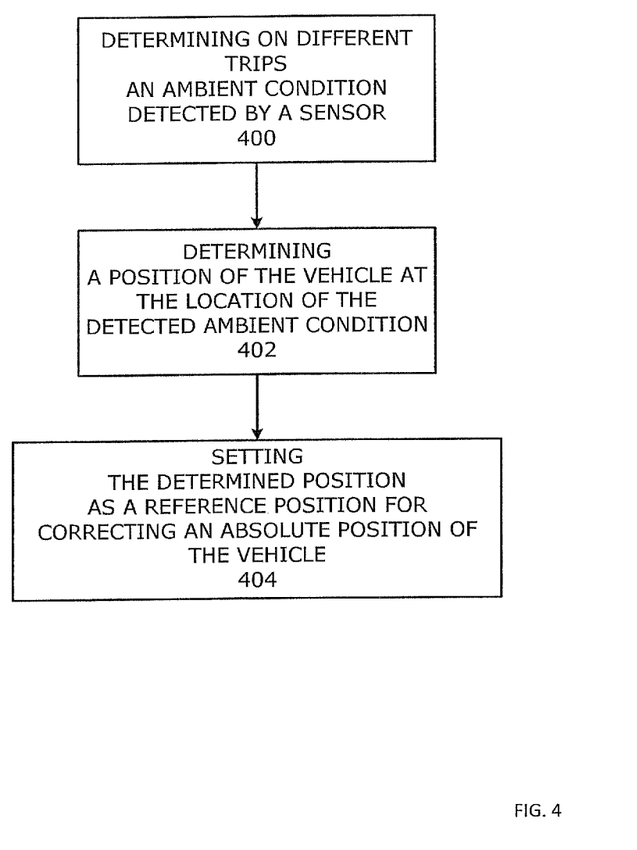
FIG. 4 is a flowchart showing an example operation of the system.

An example of the vehicle operation is shown in the flowchart of FIG. 4. Specifically, FIG. 4 shows a method for determining a reference position for an inertial navigation system in a vehicle, which is designed to determine a position of the vehicle on a roadway from a starting position and a relative position change of the vehicle.

In step 400, a processor of the inertial navigation system in the vehicle repeatedly determines, on different trips by the vehicle, an ambient condition around the vehicle. The ambient condition, for example, could be based on at least one object (e.g. traffic light) on or near the roadway detected by a sensor that is coupled to the internal navigation system in the vehicle. In step 402, the processor determines a position of the vehicle at the location of the detected ambient condition, and then in step 404 sets the determined position of the vehicle at the location of the detected ambient condition as a reference position. This reference position is used by the processor for correcting an absolute position of the vehicle, in response to the ambient condition being repeatedly detected on the different trips within a predetermined timeframe.

The invention claimed is:

1. A method for determining a reference position as the basis for a starting position for an inertial navigation system in a vehicle, which is designed to determine a position of the vehicle on a roadway from a starting position and a relative position change of the vehicle, the method comprising:
    repeatedly determining on different trips by the vehicle, by a processor of the inertial navigation system in the vehicle, an ambient condition around the vehicle, the ambient condition based on at least one object on or near the roadway detected by a sensor coupled to the internal navigation system in the vehicle,
    determining, by the processor of the inertial navigation system in the vehicle, a position of the vehicle at the location of the detected ambient condition, and
    setting, by the processor of the inertial navigation system in the vehicle, the determined position of the vehicle at the location of the detected ambient condition as a reference position for correcting an absolute position of the vehicle, in response to the ambient condition being repeatedly detected on the different trips within a predetermined timeframe.

2. The method as claimed in claim 1, wherein the determined position is associated as a reference position with the detected ambient condition on the basis of a probability with which the vehicle passes the reference position.

3. The method as claimed in claim 2, wherein the probability depends on a frequency of detection of the ambient condition which is associated with the determined position as a reference position.

4. The method as claimed in claim 3, wherein the reference position is a filter value from a number of determined positions at the point of the detected ambient condition around the vehicle.

5. The method as claimed in claim 1, comprising initiating the detection of the ambient condition on the basis of a characteristic event.

6. The method as claimed in claim 5, wherein the characteristic event is a predetermined point in time or time period.

7. A method for operating an inertial navigation system in a vehicle, which is designed to determine an absolute position of a vehicle on a roadway, the method comprising:
    repeatedly determining on different trips by the vehicle, by a processor of the inertial navigation system in the vehicle, an ambient condition around the vehicle, the ambient condition based on at least one object on or near the roadway detected by a sensor coupled to the internal navigation system in the vehicle, determining, by the processor of the inertial navigation system in the vehicle, a position of the vehicle at the location of the detected ambient condition, setting, by the processor of the inertial navigation system in the vehicle, the determined position of the vehicle at the location of the detected ambient condition as a reference position for correcting the absolute position of the vehicle, in response to the ambient condition being repeatedly detected on the different trips within a predetermined timeframe, determining a starting position for the inertial navigation system on the basis of the reference position, and determining the absolute position of the vehicle on the basis of the starting position.

8. The method as claimed in claim 7, comprising determining the starting position by correcting the reference position on the basis of a position of the vehicle determined by a satellite navigation system.

9. A method for plotting a map in a navigation system, comprising:

determining a reference position using a method as claimed in claim 1, and entering into the map the determined reference position as a road segment.

10. A control device, which is designed to implement a method for determining a reference position as the basis for a starting position for an inertial navigation system, which is designed to determine the position of a vehicle from the starting position and a relative position change of the vehicle, the control device comprising:

a processor of the inertial navigation system in the vehicle, configured to:

repeatedly determine on different trips by the vehicle, an ambient condition around the vehicle, the ambient condition based on at least one object on or near the roadway detected by a sensor coupled to the internal navigation system in the vehicle, determine a position of the vehicle at the location of the detected ambient condition, and set the determined position of the vehicle at the location of the detected ambient condition as a reference position for correcting an absolute position of the vehicle, in response to the ambient condition being repeatedly detected on the different trips within a predetermined timeframe.

* * * * *